July 22, 1941. K. A. BEIER 2,250,348
FLUID SEALING DEVICE
Filed Sept. 8, 1936
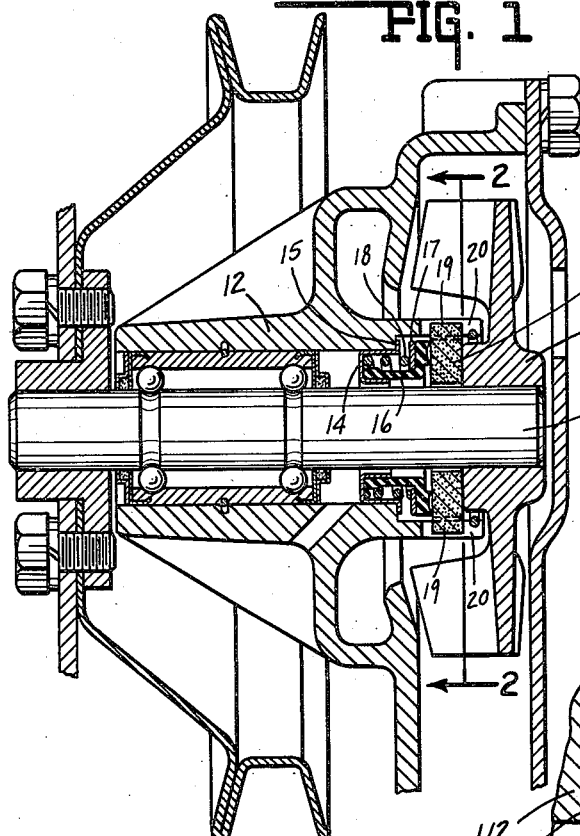
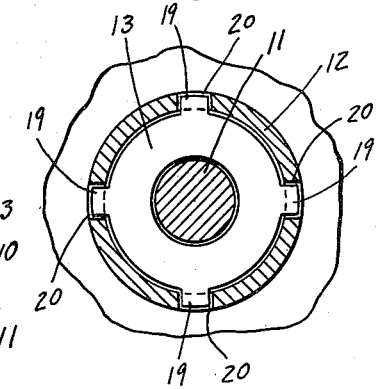
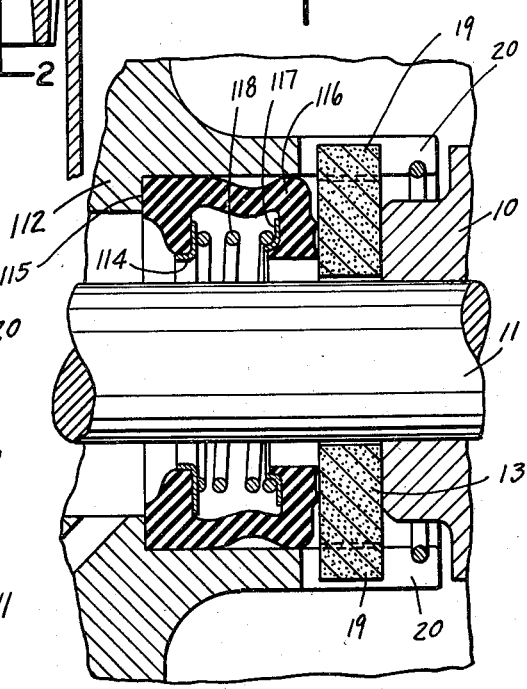
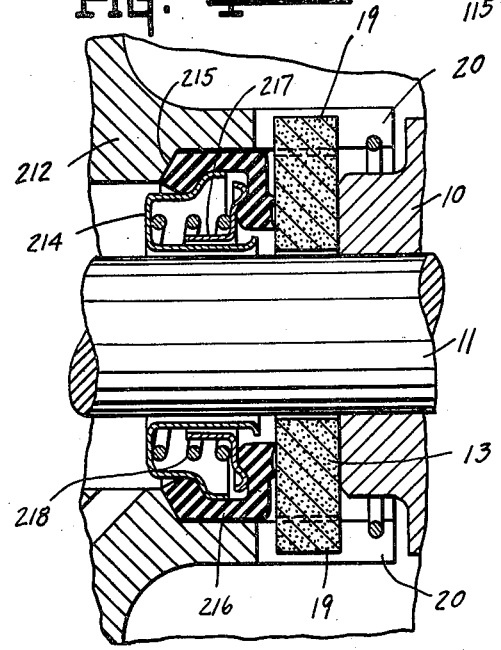
INVENTOR.
KURT A. BEIER.
BY
Lockwood Goldsmith + Galt
ATTORNEYS.

Patented July 22, 1941

2,250,348

UNITED STATES PATENT OFFICE 2,250,348

FLUID SEALING DEVICE

Kurt A. Beier, Indianapolis, Ind., assignor to Schwitzer-Cummins Company, Indianapolis, Ind., a corporation Application September 8, 1936, Serial No. 99,763

6 Claims. (Cl. 288—2)

This invention relates to an improvement in fluid sealing devices particularly adapted for use in connection with water pumps or similar devices having a shaft extending into a fluid chamber. As applied to a rotary shaft, it is adapted to retain the fluid within the fluid chamber, and eliminate or minimize leakage from the fluid chamber about the shaft.

The invention resides in the provision of a fluid seal employing a flexible sealing sleeve for permitting longitudinal movement of the sealing members with all metallic parts, as well as the entire pump shaft, out of contact with the fluid, and wherein the seal is also normally out of contact with the shaft.

Another feature of the invention resides in the fact that a unit of the seal is self-contained so that it may be assembled and disassembled as a unit. For this purpose, the metallic parts and the rubber sleeve are so formed that the sleeve snaps over and embraces the spring and its retainer to prevent "exploding" of this unit of the seal under spring pressure.

Other features of the invention will be apparent from the following description and claims and the accompanying drawing:

Fig. 1 is a central longitudinal section through a portion of a fluid pump showing the fluid seal. Fig. 2 is a section taken on the line 2—2 of Fig. 1. Fig. 3 is the same as Fig. 1 showing a modified form of fluid seal. Fig. 4 is the same as Fig. 1 showing another modified form of fluid seal.

One form of the invention is illustrated in the accompanying drawing wherein there is shown a pump impeller 10 which may be keyed or otherwise secured to an impeller shaft 11, said shaft being rotatably supported in the bearing housing 12.

The fluid seal is positioned within the bearing housing 12 and abuts the end of the impeller 10 in sealing engagement therewith. Said seal comprises a washer 13 formed preferably of carbon or a suitable carbon composition which freely surrounds the shaft 11 with one surface in sealing engagement with the end of the impeller 10. Also freely surrounding said shaft and normally out of contact therewith there is a metal spring retaining member in the form of a cup 14 which has a tight fit within the housing 12. Said cup is formed with an outer flanged wall extending over and spaced from an inner shaft embracing tubular portion. The outer wall of the cup is provided with an outwardly extending flange terminating in an enlarged portion of the bearing housing so as to bear in sealing engagement with the shoulder 15 as well as the barrel of the housing.

A flexible sleeve 16 is preferably formed of rubber, synthetic rubber or a suitable rubber composition. It is provided with an enlarged ring bearing against the inner surface of the cup 14 and an enlarged outer ring or flange of greater diameter bearing against the washer 13. A second spring retaining member in the form of a metal ring 17 lies against the inner surface of the outer sleeve flange to retain the spring 18 under tension against the cup 14.

The spring 18 acts to maintain the washer 13 in sealing contact with the impeller 10 and the outer sleeve flange in sealing contact with the washer. Fluid is sealed from contact with the shaft by reason of the several sealing surfaces above mentioned.

The seal, including the washer, sleeve and spring retainers remain stationary with the bearing housing. For this purpose, the washer 13 is provided with four radially extending lugs 19 slidably mounted in the keyways 20 provided in the end of the housing bearing. Said keyways permit free longitudinal movement of the washer relative to the bearing housing, said flexible sleeve compensating therefor under tension of the spring 18.

It will be noted that in this form, as well as the other modifications, there is no metallic contact between the seal and shaft, the rubber sleeve being spaced therefrom.

The form of seal illustrated in Fig. 3 is similar to that above described except that the spaced flanges of the rubber sleeve 116 embrace and snap over the spring retaining members 114 and 117, respectively, so as to retain the spring 118 under compression. This provides a most convenient self-containing unit for assembly, and the several parts of the seal are held together in such manner as to prevent "explosion" of the seal under spring tension. This comprises one of the most important and valuable features of the invention.

Another valuable feature of this modification lies in the fact that the spring 118 is contained within the sleeve 116, as well as all other metallic parts, such as the spring retaining members 114 and 117. This arrangement prevents the fluid from contacting such parts, which serves to greatly increase their life and serviceability. Thus the spring causes pressure to be exerted against the outer flange of the sleeve 116 to force it into sealing engagement with the shoulder 115 of the bearing housing, the inner flange against the washer 13 and said washer against the bearing impeller 10.

By means of the above described arrangement of the seal, fluid from about the impeller 10, or from the fluid chamber in which it operates is prevented from escaping or reaching the shaft, bearing or metallic parts of the sealing device. This is accomplished by the sealing contact between the washer 13 and end of the impeller 10, and also by the sealing contact between the outer flange of the sleeve 116 and shoulder 115, and the inner flange and washer.

In the third modification illustrated in Fig. 4, the sleeve 216 is provided with an enlarged flange which is engaged and compressed under spring tension between the shoulder of the cup 214 and a corresponding annular shoulder 215 formed in the bearing housing and connecting with an enlarged recess adapted to snugly receive said sleeve. At the opposite end of the sleeve, there is provided a flange of lesser diameter having a cupped surface compressed into sealing contact with the inner surface of the washer 13. Intermediate said flanges the rubber sleeve is reduced in thickness to provide flexibility with an inwardly extending flange portion terminating in the last mentioned inner ring. Thus the rubber sleeve may be flexed longitudinally of the shaft to take up wear or play of the sealing washer 13.

Within the cup 214 there is a metal flanged ring 217 having an annular sleeve portion surrounding the tubular portion of the cup 214 from which an outwardly extending flange portion extends into contact with the inner flange of the sleeve. Within the cup 214, a spring 218 is provided. One end of said spring engages the cup, and the other end thereof engages the flange of the ring 217.

The flexibility of the intermediate portion of the several sleeves freely permits of longitudinal variations and misalignment of the washer, bearing surface and shaft without affecting their sealing relation and without any fluid or metallic contact with the shaft, and also without any contact therewith by the rubber or rubber composition sleeve.

The invention claimed is:

1. A composite sealing element comprising a longitudinally expansible and contractible channeled ring, a two-piece casing having radially extending side walls mounted within the sides of the said ring and having telescoping cylindrical walls, and a coil spring having its opposite ends engaging the side walls of said casing, the end of one of the cylindrical walls having a radially outwardly projecting wall adapted to limit the separation of the two parts of the casing by the spring therewithin.

2. In a fluid seal, a self contained unit comprising a flexible sleeve of annular formation adapted to enclose a shaft, spaced resilient integral flanges on said sleeve, an annular spring retaining member concentric with said sleeve and arranged in engagement with one of said flanges, a second annular spring retaining member arranged in engagement with the other of said flanges and concentric with said sleeve, said second spring retaining member including an extension thereon arranged to fit telescopically within a portion of the first mentioned spring retaining member so that said spring retaining members are associated with one another, and a spring disposed within said sleeve and between said spring retaining members and exerting an expanding force thereon for flexing said flanges about their connections with said sleeve, said flanges having sufficient resistance to such flexing action for retaining said sleeve, spring retaining members and spring together as a unit.

3. In a fluid seal, a self contained unit comprising a flexible sleeve of annular formation adapted to enclose a shaft, spaced resilient integral flanges on said sleeve, expanding means located within the sleeve and acting between said flanges for flexing said flanges about their connections with said sleeve, said flanges having sufficient resistance to such flexing action for retaining the sleeve and the said means together as a unit.

4. In a fluid seal, a self contained unit comprising a flexible sleeve of annular formation adapted to enclose a shaft, spaced resilient integral flanges on said sleeve, a pair of annular spring retaining members concentric with said sleeve and arranged in engagement with said flanges, and a spring disposed between said spring retaining members and within said sleeve, said spring acting through said spring retaining members to flex said flanges about their connections with said sleeve, said flanges having sufficient resistance to such flexing action for retaining said sleeve, spring retaining members and spring together as a unit.

5. A composite sealing element comprising a longitudinally expansible and contractible channeled ring, a two-piece casing having radially extending side walls mounted within the sides of the said ring and having telescoping cylindrical walls, and a coil spring having its opposite ends engaging the side walls of said casing.

6. A composite sealing element comprising a longitudinally expansible and contractible channeled ring, a two-piece casing having radially extending side walls mounted within the sides of the said ring, and a coil spring having its opposite ends engaging the side walls of said casing.

KURT A. BEIER.